United States Patent [19]

Iio

[11] 4,337,734
[45] Jul. 6, 1982

[54] TWO-CYCLE ENGINE

[75] Inventor: Toshimitsu Iio, Hamamatsu, Japan

[73] Assignee: Yamaha Hatsudoki Kabushiki Kaisha, Iwata, Japan

[21] Appl. No.: 192,336

[22] Filed: Sep. 29, 1980

[30] Foreign Application Priority Data

Sep. 27, 1979 [JP] Japan .................. 54-124557

[51] Int. Cl.$^3$ ............................................ F02B 25/14
[52] U.S. Cl. ............................ 123/65 PE; 123/65 P; 123/65 R; 123/65 PD
[58] Field of Search ............ 123/65 PE, 65 PD, 65 P, 123/65 EM, 65 R

[56] References Cited

U.S. PATENT DOCUMENTS

| 816,711 | 7/1907 | Croft | 123/65 P |
| 1,176,096 | 3/1916 | Richter et al. | 123/65 PD |
| 1,468,962 | 9/1923 | Davidson | 123/65 P |
| 1,520,620 | 12/1924 | Wall | 123/65 P |
| 1,839,576 | 1/1932 | Mohr et al. | 123/65 PE |
| 1,899,217 | 2/1933 | Taylor et al. | 123/65 P |
| 1,952,275 | 3/1934 | Mohr | 123/65 PE |
| 2,393,341 | 1/1946 | Schmeider | 123/65 PE |
| 2,638,081 | 5/1953 | Spannhake | 123/65 P |
| 3,945,345 | 3/1976 | Johnston | 123/65 P |

FOREIGN PATENT DOCUMENTS

| 163819 | 10/1905 | Fed. Rep. of Germany | 123/65 P |
| 316922 | 12/1919 | Fed. Rep. of Germany | 123/65 P |
| 525823 | 9/1940 | United Kingdom | 123/65 P |

Primary Examiner—Wendell E. Burns
Attorney, Agent, or Firm—Donald D. Mon

[57] ABSTRACT

In a two cycle internal combustion engine having a cylinder, a piston, and an exhaust port, the improvement comprising tapering the edge of the exhaust port farthest into the cylinder where it intersects the cylinder wall as an isosceles triangle.

6 Claims, 5 Drawing Figures

TWO-CYCLE ENGINE

FIELD OF THE INVENTION

The present invention relates to a two-cycle engine and, more particularly, to the shape of an exhaust port thereof.

BACKGROUND OF THE INVENTION

In a two-cycle engine, generally speaking, the exhaust port and scavenging port, which are formed in the wall of a cylinder, are opened and closed by the operations of a piston so that the exhaust timing is determined in accordance with the opened position of the exhaust port.

More specifically, as the exhaust port comes the closer to a combustion chamber, the exhaust timing is so advanced as to be more appropriate to the high speed running of the engine so that the engine's characteristics are those of the high speed type, in which a high output performance is attained in the high speed run range.

On the contrary, if the exhaust timing is retarded, the engine's characteristics are changed into those of a low speed type.

Thus, according to the current practice, the exhaust timing is determined as to be appropriate to the intermediate speed run range, thereby to provide an engine of the intermediate speed type.

BRIEF DESCRIPTION OF THE INVENTION

In this invention, in order to improve this engine into the high speed type, the shape of the exhaust port is modified.

The invention will be fully understood from the following detailed description and the accompanying drawings, in which:

DETAILED DESCRIPTION OF THE INVENTION

Figure 3:
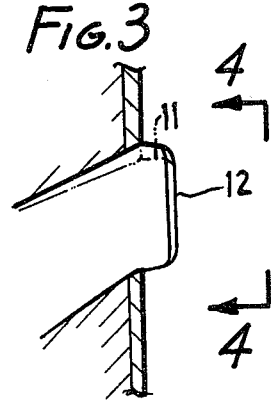
FIG. 3 is a sectional view showing the exhaust port of the engines of the intermediate and high speed type according to the prior art.
Figure 4:
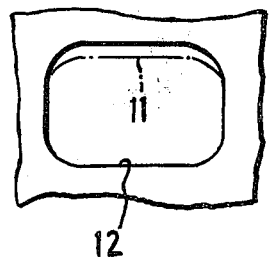
FIG. 4 is a view seen in the direction of arrow IV of FIG. 3.

The shape of the exhaust port of the engine as improved by this invention is shown in FIGS. 3 and 4.

The improved exhaust port indicated at numeral 12 has its effective area augmented by cutting over the whole length of the upper edge of an exhaust port 11 as it existed before this improvement.

As a result, the upper edge of the opening of the exhaust port 12 comes closer to the combustion chamber so that the exhaust timing is advanced.

However, the engine of the intermediate speed type and the engine improved into the high speed type are different in their output performances at the respective run ranges. These output performances of the two engines are graphically plotted in FIG. 5.

As is apparent from the graph, the engine of the intermediate speed type has its output performance remarkably deteriorated in the high speed run range.

On the contrary, the engine of the high speed type indeed has its output performance more improved in the high speed run range than that of the engine of the intermediate speed type but has its output performance more deteriorated in the intermediate and low speed run ranges than that of the same type engine.

The present invention has been conceived in view of the background thus far described and contemplates to provide a two-cycle engine which succeeds both in suppressing the reduction in the output performance in the low speed run range and in improving the output performance in the high speed run range.

Thus, the present invention is characterized in that the exhaust port has its upper edge chamfered at a predetermined angle into a triangular shape which smoothly merges from both sides thereof.

Figure 1:
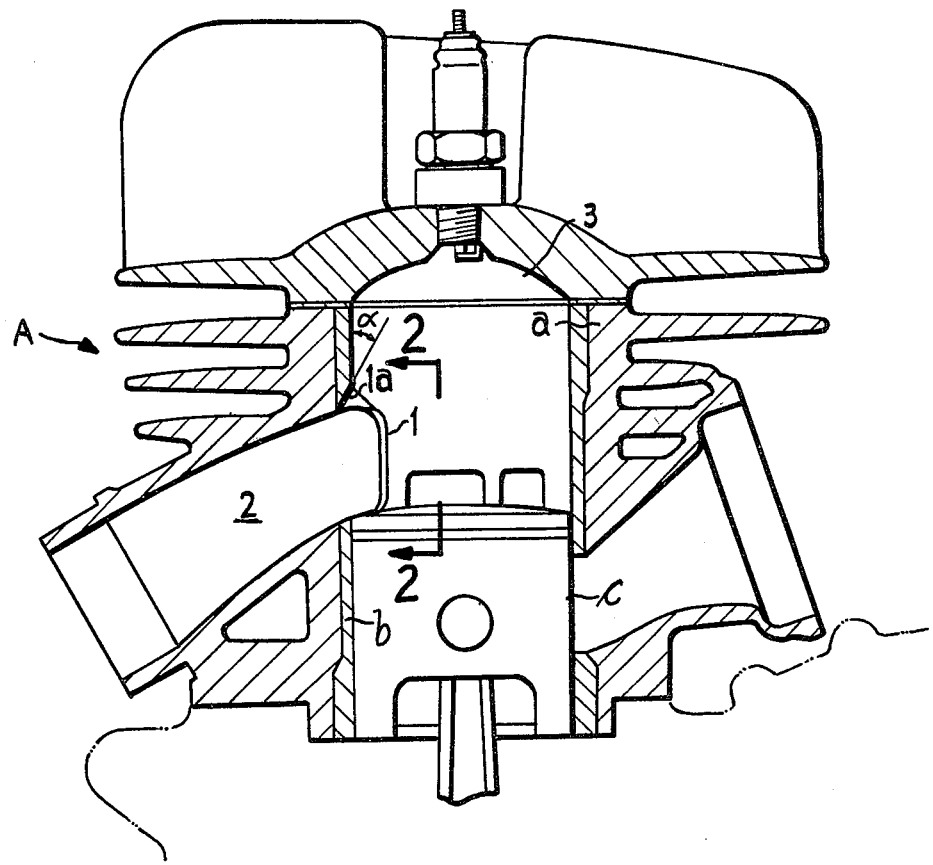
FIG. 1 is a longitudinal section showing a two-cycle engine according to the present invention.
Figure 2:
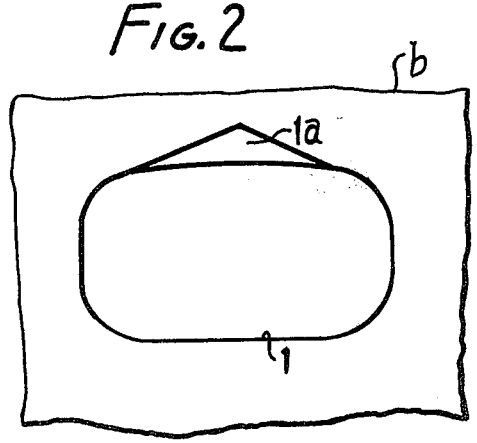
FIG. 2 is enlarged view seen in the direction of arrow II of FIG. 1.

The present invention will now be described in connection with one embodiment thereof with reference to the accompanying drawings. In FIG. 1 showing a two-cycle engine A, reference letter a indicates a cylinder; letter b indicates a sleeve press-fitted in the cylinder a; letter c indicates a piston; numeral 1 indicates an exhaust port; numeral 2 indicates an exhaust passage; and numeral 3 indicates a combustion chamber.

The aforementioned exhaust port 1 is opened in a generally rectangular shape into the wall of sleeve b and has its upper edge chamferred at an angle into such an equilaterally triangular shape as smoothly merges from the both sides thereof.

The portion 1a thus chamferred has its area gradually increased from the both sides thereof to the center thereof thereby partly to increase the effective area of the exhaust port 1 and partly to shift the opened position toward the combustion chamber 3.

On the other hand, the chamfering angle of the portion 1a is usually predetermined at 30 to 45 degrees and has been found the most proper at 30 degrees by the experiments.

Figure 5:
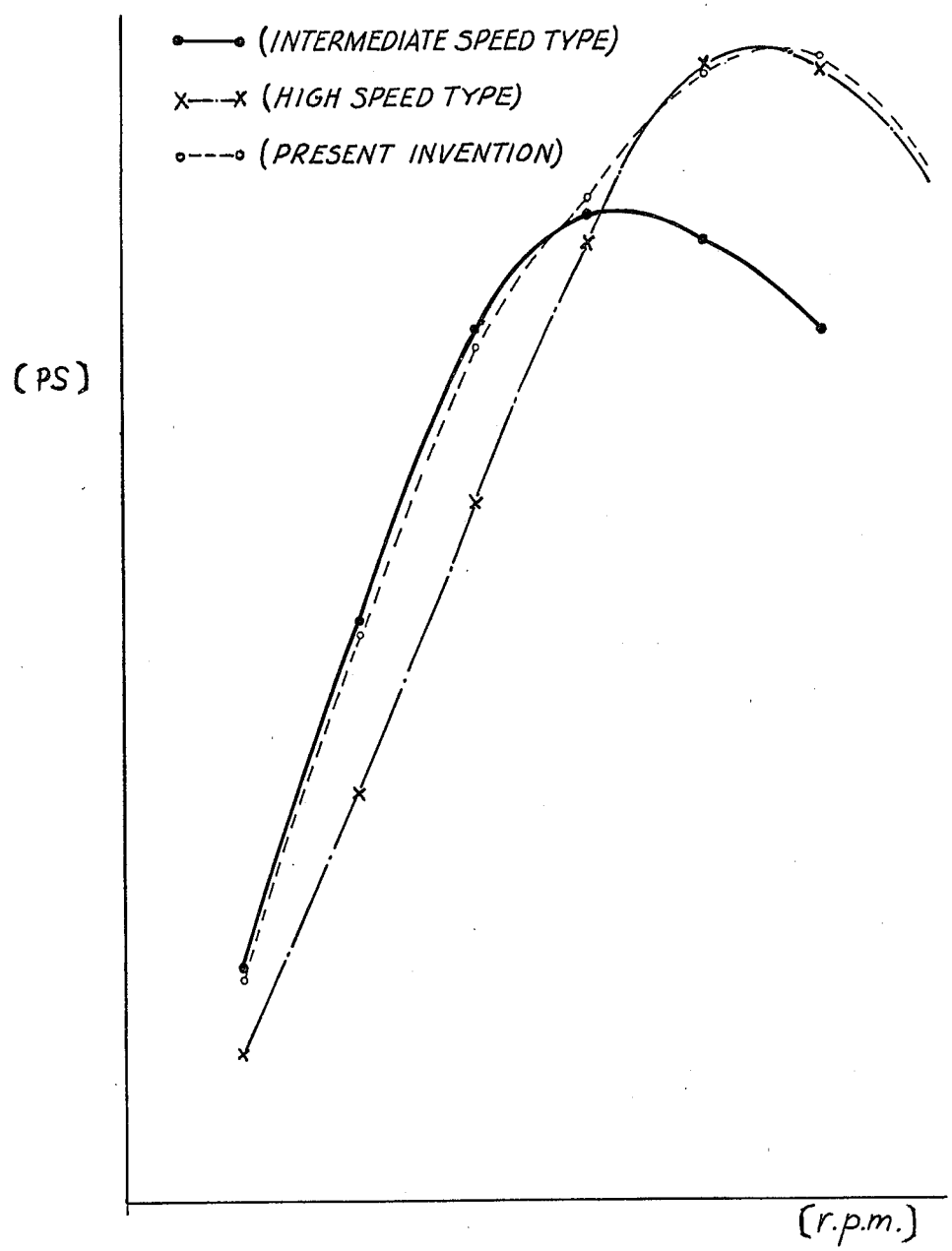
FIG. 5 is a graphical presentation plotting the output performances of the engines according to the prior art and the present invention against the r.p.m. thereof.

As a result, the two-cycle engine A having the exhaust port 1 thus shaped exhibits an output engine of the intermediate and high speed types and which is also graphically plotted in FIG. 5.

As is apparent from the graph, the two-cycle engine according to the present invention exhibits substantially the same or slightly lower output performance as or than that of the engine of the intermediate speed type in the run range from the low to the intermediate speed but not such apparent reduction in the output power as that of the engine of the high speed type. In the high speed run range, on the other hand, the present two-cycle engine exhibits an output performance substantially equal to or higher than that of the engine of the high speed type but not such remarkable reduction in the output power as that of the engine of the intermediate speed type.

Since the present invention is constructed in the manner described hereinbefore, by the simple work of chamfering the upper edge of the existing exhaust port, the output performance of the engine can be prevented from being reduced in the low speed run range and can be improved in the high speed run range.

Since, moreover, the chamfered portion of the exhaust port smoothly merges from the both sides of the upper edge of that exhaust port, the acute portion to be heated red, i.e., the so-called "heat point" is eliminated so that the sleeve or the like can be prevented from being deformed.

Thus, the desired object of the present invention can be attained.

I claim:

1. In a two cycle engine of the type having a cylinder with an axis, a piston slidably disposed in said cylinder, and an exhaust port through the wall of said cylinder, the closed and opened condition of said exhaust port being a function of the axial position of said piston in said cylinder, said exhaust ports having generally axial side walls and an upper edge extending into the cylinder and away from the piston when said piston is in a lower position, said upper edge at its intersection with the inside cylinder wall, viewed toward said exhaust port, forming the upper portion of an isosceles triangle.

2. Apparatus according to claim 1 in which said triangle is also equilateral.

3. Apparatus according to claim 1 in which said exhaust port at the outside wall of said cylinder is generally rectangular, said exhaust port merging smoothly from said outside wall to said inside wall.

4. Apparatus according to claim 3 in which said merging occurs at a chamferred angle with said axis between about 30° and about 45°.

5. Apparatus according to claim 3 in which said triangle is also equilateral.

6. Apparatus according to claim 4 in which said triangle is also equilateral.

* * * * *